United States Patent [19]

Imafuji et al.

[11] Patent Number: 5,634,142
[45] Date of Patent: May 27, 1997

[54] CAMERA HAVING A VIBRATION CORRECTION LENS AND A METHOD FOR CORRECTING IMAGE VIBRATION

[75] Inventors: Kazuharu Imafuji, Kawasaki; Sueyuki Ohishi; Hiroshi Okano, both of Tokyo; Susumu Sato, Chiba, all of Japan

[73] Assignee: Nikon Corporation, Tokyo, Japan

[21] Appl. No.: 254,759

[22] Filed: Jun. 6, 1994

[30] Foreign Application Priority Data

Jun. 4, 1993 [JP] Japan .................................. 5-160316

[51] Int. Cl.⁶ ........................................................ G03B 5/00
[52] U.S. Cl. ................................................ 396/52; 396/55
[58] Field of Search .................................. 354/400, 410,
354/430, 70, 202, 195.1; 348/208; 359/813,
814; 396/52–55

[56] References Cited

U.S. PATENT DOCUMENTS

| 4,783,676 | 11/1988 | Aihara et al. |
|---|---|---|
| 4,970,540 | 11/1990 | Vasey et al. ........................ 354/202 |
| 5,192,964 | 3/1993 | Shinohara et al. |
| 5,257,053 | 10/1993 | Kobagashi et al. |
| 5,369,462 | 11/1994 | Miyazawa et al. |
| 5,389,997 | 2/1995 | Ohishi |
| 5,416,558 | 5/1995 | Katayama et al. |

*Primary Examiner*—Safet Metjahic
*Assistant Examiner*—Daniel Chapik

[57] ABSTRACT

A camera having a vibration correction lens to correct image vibration in the imaging plane, the vibration correction lens being driven within a lens barrel according to the output of a sensor for detecting hand tremor of the camera. The camera also has a memory unit, such as an EEPROM, to store information on the position of the vibration correction lens within the lens barrel, the position of best optical performance of the vibration correction lens and the position of the drive range limits and similar information. Prior to the camera correcting for image vibration, the vibration correction lens is moved to the position of best optical performance, this position being the one where the optical axis of the vibration correction lens coincides with an optical axis of another optical lens system in the camera.

24 Claims, 6 Drawing Sheets

CAMERA HAVING A VIBRATION CORRECTION LENS AND A METHOD FOR CORRECTING IMAGE VIBRATION

BACKGROUND OF THE INVENTION

1. Field of the Invention

The present invention relates to a camera having a vibration correction lens and a method for correcting image vibration, such that at least one portion of the vibration correction lens can move in a direction of the optical axis of the camera or in a direction orthogonal to the optical axis and, more particularly, to a camera having a movable lens suitable as the vibration correction lens to prevent image vibration on the imaging plane of the camera.

2. Description of the Related Art

Cameras have been made markedly more electronic in recent times, to include automatic exposure functions and autofocus functions, with a high degree of automation. However, in these types of automated cameras, one aspect of automation in which attempts have been insufficient is that of countermeasures against image vibration due to hand tremor and the like arising during hand-held photography.

Various vibration correction devices have been proposed to incorporate such countermeasures, particularly those countermeasures preventing image deflections arising from the tilting of the camera. These various vibration correction devices detect the vibrations or vibratory motions of the camera, and based on the result of this detection, image vibrations in the imaging plane are prevented.

Namely, a camera having an anti-vibration function, equipped with a prior art vibration correction device, detects the angular velocity or angular acceleration of the vibratory motion of the camera which is caused by hand tremor. According to these detected values, a suitable amount of correction of the image vibration in the imaging plane due to the hand tremor is calculated by a microcomputer, or some other calculating unit. Based on the result of this calculation, a vibration correction lens system arranged in the lens barrel and driven by a drive mechanism in either an up and down or right and left direction (a direction orthogonal to the optical axis), performs a correction of the photographic light path such that the image is brought to a standstill in the image plane.

A vibration detection unit used in the prior art camera is, for example, an angular velocity sensor, or an acceleration sensor using a piezoelectric element, which detects the force received when a physical body rotates, the so-called "Coriolis force". Moreover, in place of using a vibration correction lens system, the vertex angle of a variable vertex angle prism can be changed. Furthermore, a voice coil or an electric motor, is used, for example, as an actuator to drive the vibration correction lens system or the variable vertex angle prism.

In a camera having such an anti-vibration function, in the case in which the optical axes of the vibration correction lens and the other optical lens system of the camera coincide, the optical performance of the optical system is not degraded. However, in the case of performing a vibration correction, when the vibration correction lens moves and its optical axis is displaced from the optical axis of the other optical lens system, the optical performance is degraded from what it was when the optical axes coincided.

Thus, in a camera having an anti-vibration function, better photographs are obtained when photographed in a given position in which the optical axis of the correction lens and the optical axis of the other optical system coincide or in a vicinity of this given position.

However, in the abovementioned prior art cameras having an anti-vibration function, the problem is that in the case of photographing without performing vibration correction, the position in which the vibration correction lens is held is not necessarily the position in which the optical performance is the best, the position of best optical performance being the one where the optical axis of the vibration correction lens coincides with the optical axis of the other optical lens system. Photographs taken such that the vibration correction lens is at an arbitrary position other than the position of best optical performance are degraded in resolution and the like in comparison with photographs taken with the vibration correction lens being in the position of best optical performance.

Moreover, even in the case of photographing while performing correction of vibration, when the amount of vibration is small and the amount of drive of the vibration correction lens is small, it is possible to take photographs with a better resolution when the correction lens is in a position in which the displacement of the optical axes of the correction lens and of the other optical lens system is small.

Because of this, devices for driving and holding the vibration correction lens in the position of best optical performance have been considered, but because a mechanical lock, which maintains the vibration correction lens in a position such that the optical axes of the optical systems coincide, and the like are set up for this purpose, there are problems in that the size of the device is increased, and the variability of the positional accuracy becomes large.

In addition, in the case of performing vibration correction, when the vibration correction lens is driven, instances occur when the vibration correction lens reaches the end of its drive range. One problem is that, at this time, upon reaching the end of the drive range with the drive speed of the correction lens in a fast state, an impact occurs due to the mechanical collision of the vibration correction lens with the body of the camera, resulting in a new vibration of the camera, and mechanical breakdown of the correction lens drive system occurs.

SUMMARY OF THE INVENTION

Accordingly, it is an object of the present invention to provide a camera having a movable lens, able to obtain photographs of good resolution by performing photography at the position of the best optical performance of the movable lens.

Another object of the present invention is to provide a camera having a movable lens which can prevent the generation of vibratory motion and breakdown of the vibration correction device, caused by the collision of the movable lens with the limit positions of the range of movement in the camera body.

Additional objects and advantages of the invention will be set forth in part in the description which follows, and, in part, will be obvious from the description, or may be learned by practice of the invention.

The above objects are achieved by a first type of camera which includes a vibration detection unit to detect the amount of vibration resulting from motion of the camera, a movable lens, movement of which makes it possible to correct the image vibration on the imaging plane, a lens drive unit to drive the movable lens, a calculating unit to perform calculations to determine the amount of drive of the movable lens, according to the magnitude of the amount of vibration detected by the vibration detection unit, a memory unit to store absolute position information of the movable lens, and a drive control unit to perform the driving of the movable lens by means of the lens drive unit, based on the absolute position information obtained from the memory unit when the movable lens is driven according to the amount of drive calculated by the calculating unit.

The above objects are further achieved by a second type of camera which includes a movable lens, movement of which is possible in the direction of the optical axis or in a direction perpendicular to the optical axis, a drive unit to drive the movable lens, a calculating unit to perform calculations to determine the amount of drive of the movable lens, a memory unit to store absolute position information of the movable lens, and a drive control unit to perform the driving of the movable lens by means of the lens drive unit, based on the absolute position information obtained from the memory unit when the movable lens is driven according to the amount of drive calculated by the calculating unit.

The above objects are still further achieved by a third type of a camera having the same features as either the first or the second type of camera, wherein the memory unit stores position information, including the position of best optical performance of the movable lens, and the limit positions of the drive range of the movable lens.

In the present invention, absolute position information of the movable lens, for example, information of the position of best optical performance of the movable lens, is stored in a memory unit located in the lens barrel. Because of this, for example, in the case in which a photograph is taken while not performing vibration correction, taking of a photograph is performed after the movable lens had been driven to the position for best optical performance previously stored in the memory unit. Accordingly, it becomes possible to take photographs having better resolution.

Moreover, when a photograph is taken while performing vibration correction, directly before performing an exposure, the movable lens is driven to the position of best optical performance, previously stored in the memory unit. Accordingly, when the amount of vibration is small, because photography is performed in the vicinity of the position of best optical performance of the movable lens, it becomes possible to take photographs having better resolution.

Furthermore, the drive range limit positions, forming the boundaries of the drive range of the movable lens, are established and stored in the memory unit. These drive range limit positions allow such recognition of the fact that the movable lens is being driven to either one of the limit positions of the drive range. Accordingly, the drive speed of the movable lens is reduced at the limit positions, and it becomes possible to avoid collision at the ends of the drive range.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
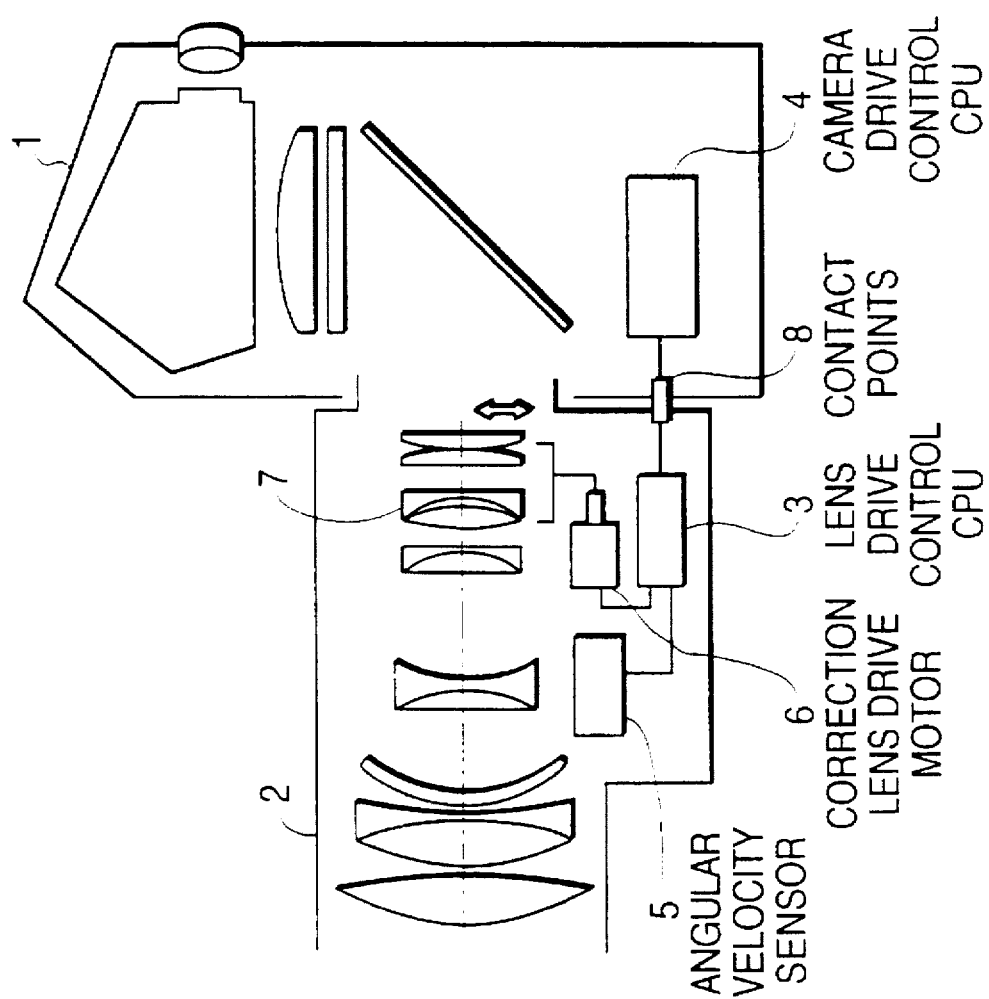
FIG. 1 is a cross sectional view showing a camera having a movable lens according to a first embodiment of the present invention.

Reference will now be made in detail to the present preferred embodiments of the present invention, examples of which are illustrated in the accompanying drawings, wherein like reference numerals refer to like elements throughout.

Figure 2:
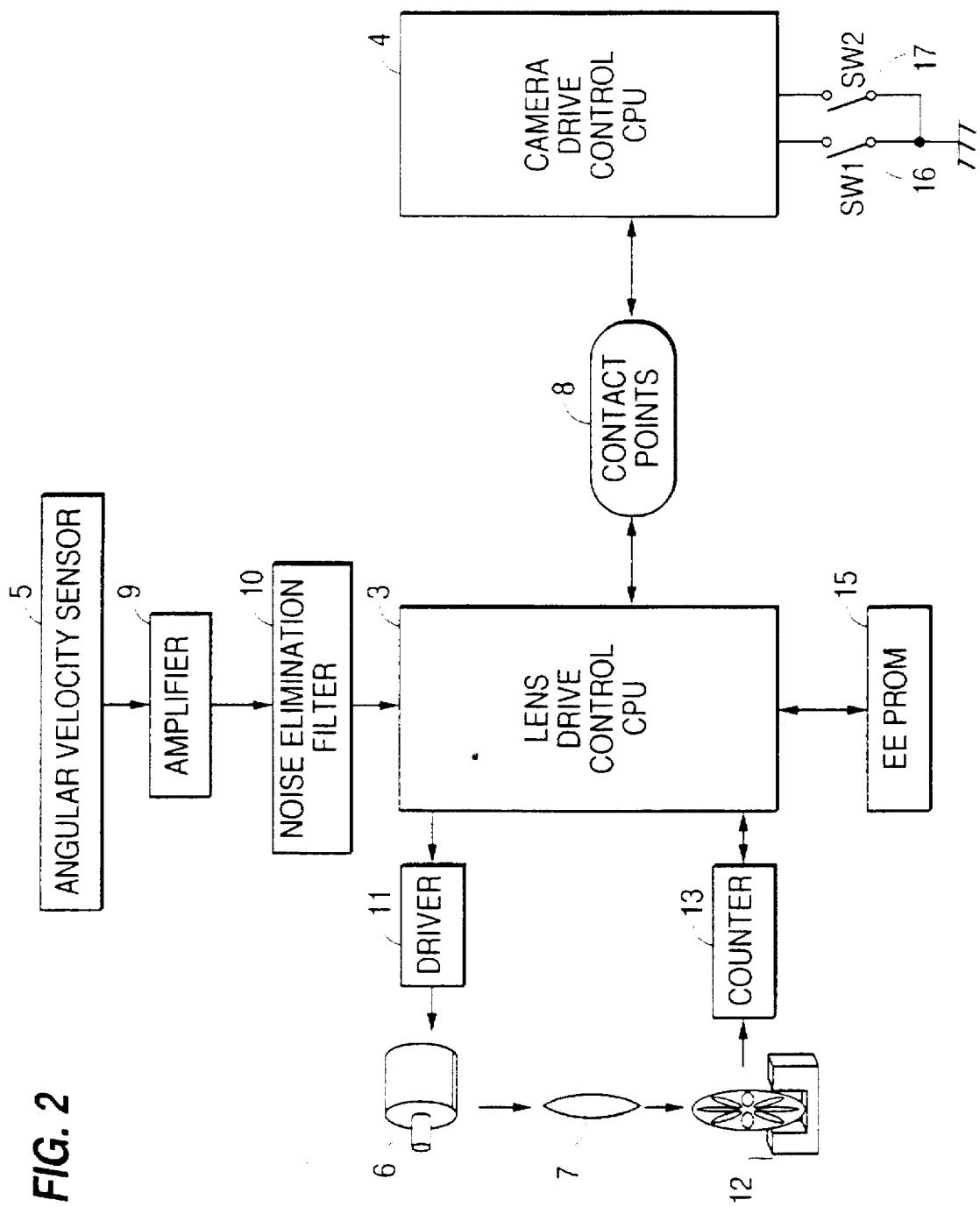
FIG. 2 is a block diagram showing a control system of a camera having a movable lens according to the first embodiment of the present invention.
Figure 3:
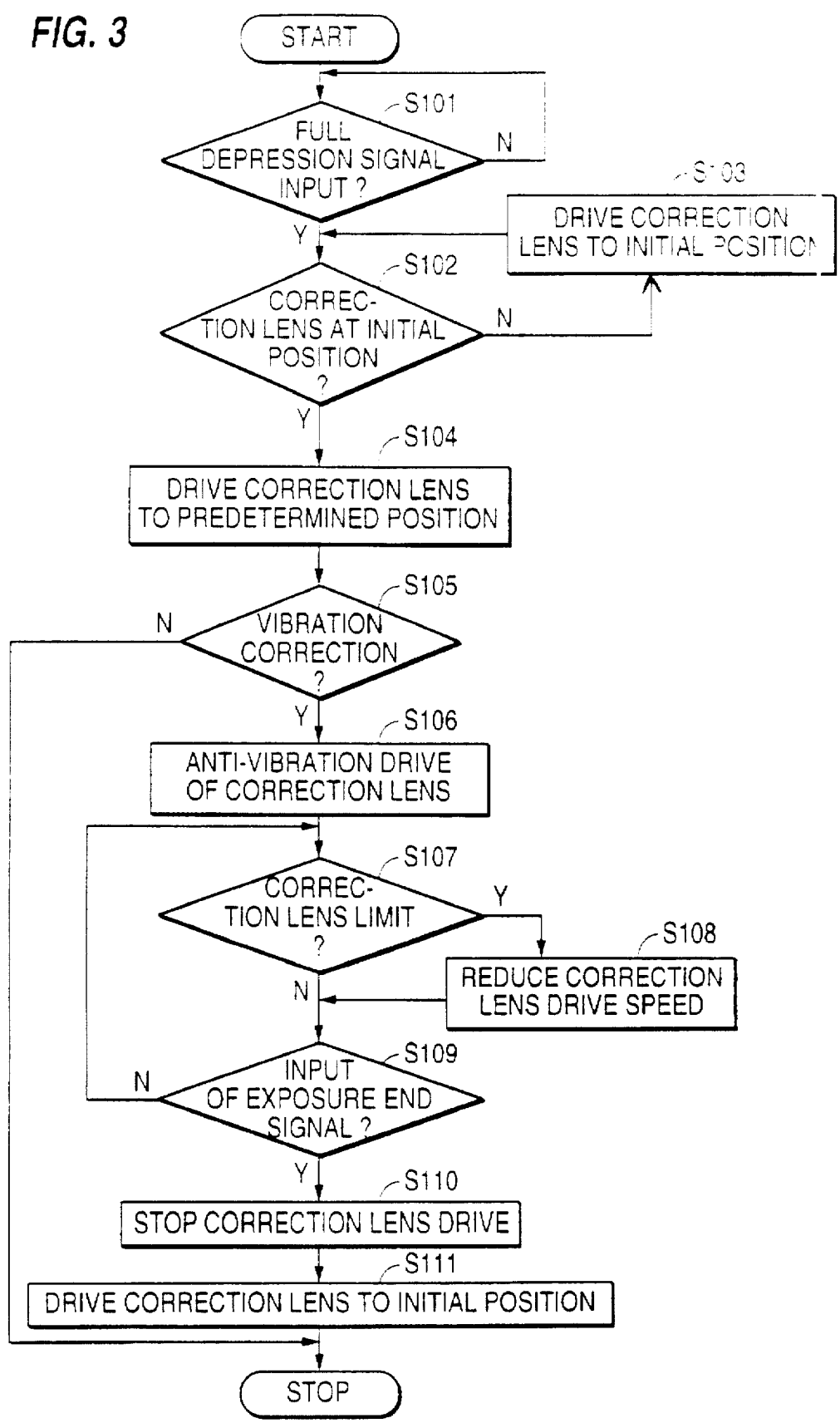
FIG. 3 is a flow chart illustrating the operational routine of the camera according to the first embodiment of the present invention.

FIG. 1 is a cross sectional view showing a camera having a movable lens according to a first embodiment of the present invention, FIG. 2 is a block diagram showing the control system of the camera having a movable lens according to the first embodiment and FIG. 3 is a flow chart illustrating the operational routine of the camera according to the first embodiment.

FIG. 1 shows a camera body 1 equipped with a camera drive control CPU 4 which controls the photographic actions of the camera and a lens barrel 2 which is detachably mounted to the camera body 1.

The lens barrel 2 is equipped with a lens drive control CPU 3 on the lens barrel side, in order to control the photographic action of the lens barrel 2, an angular velocity sensor 5, which outputs a voltage proportional to the angular velocity of camera vibration due to hand tremor and the like, a vibration correction lens 7 which is capable of movement up and down, and left and right (orthogonal to the optical axis of the vibration correction lens 7) and a correction lens drive motor 6 which drives the vibration correction lens 7. The lens drive control CPU 3 and the camera drive control CPU 4 are electrically connected by contact points 8 arranged in a mounting portion of the camera body 1 and the lens barrel 2.

FIG. 2 is a block diagram, showing in more detail, the control system of the camera of FIG. 1. The angular velocity sensor 5 detects the angular velocity of the lens barrel 2 caused by hand tremor and outputs a detection signal. After the detection signal output is amplified by means of an amplifier 9, it is input to a noise elimination filter 10. The noise elimination filter 10 cuts off the high frequency noise of the amplified detection signal, and the output is sent to the lens drive control CPU 3.

The lens drive control CPU 3, based on the input from the noise elimination filter 10 indicative of the angular velocity of vibrations of the camera body, due to hand tremor and the like, and information on the focal length of the photographic lens optical system, calculates the angle and amount of motion of the image on the imaging plane due to the vibrations of the camera body, and based on these results, determines an appropriate drive speed of the vibration correction lens 7.

The output of the lens drive control CPU 3 is sent via driver 11 to the correction lens drive motor 6 which, by moving the vibration correction lens 7 according to the calculated drive speed, performs a correction of image vibration.

The light screening revolving plate of the photointerrupter 12 is rotated by the correction lens drive motor 6 such that optical transmission and screening are repeated, and a number of pulses is generated, proportional to the amount of movement of the vibration correction lens 7. The photointerrupter 12 outputs two series of pulses, an A phase and a B phase, these two series of pulses being displaced 90° in phase, and are fixed by the timing of the rise and fall of the pulses in each direction, by detection of a low level or a high level of the other pulse, such that the drive direction can be determined. The pulses generated by the photointerrupter 12 are output to a counter 13.

The counter 13 counts the number of input pulses, and outputs a count value to the lens drive control CPU 3. The lens drive control CPU 3 receives this count value and calculates the relative position and the speed of movement of the vibration correction lens 7.

The EEPROM 15 stores the position of the vibration correction lens 7, and is arranged in the lens barrel 2. The lens drive control CPU 3, in order to store the position of best optical performance of the vibration correction lens 7, the limit positions of the drive range, and the like, writes into the EEPROM 15 the number of pulses of the photointerrupter 12 corresponding to the distance up to the position of best optical performance from an initial position (a first limit position of the drive range of the vibration correction lens 7) of the vibration correction lens 7. This position of best optical performance is the position where the optical axis of the vibration correction lens coincides with the optical axis of the other optical system.

In the case in which the vibration correction lens 7 is moved up to the position of best optical performance from its initial position, the lens drive control CPU 3 controls the drive such that it moves the vibration correction lens 7 to the extent of the pulse number written into the EEPROM 15 from this position.

Moreover, the lens drive control CPU 3, in order to store the limit positions of the drive range of the vibration correction lens 7, drives the vibration correction lens 7 from one end (lens limit 1) to the other end (lens limit 2) of the drive range, counting the full scale pulse number of the drive range. The lens drive control CPU 3 writes into the EEPROM 15 the pulse number corresponding to the distance between the lens limit 1 and the initial position, this distance being predetermined. Then, the lens drive control CPU 3 subtracts the pulse number corresponding to the distance between the lens limit 1 and the initial position from the full scale pulse number of the driving range and writes this result into the EEPROM 15.

Before correcting for the vibration of the camera body 1, in a situation where correction is to be performed, the vibration correction lens 7 is driven up to its initial position, and then the count value of the counter 13 is reset, thereby commencing the correction of vibration. Then, the vibration correction lens 7 is driven, and when a second limit position of the drive range which has been written into the EEPROM 15 has been reached, the drive speed of the vibration correction lens 7 is reduced, and the vibration correction lens 7 avoids collision with the end of the drive range.

On the other hand, a signal is input from a release button (not shown in the drawing) disposed on the camera body 1 to the camera drive control CPU 4, and by means of the half depression action of the release button, a photometry and rangefinding switch 16 (SW1) is set ON. Photometric and rangefinding units (not shown in the drawing) perform a predetermined photographic standard actions. By a further actuation of the release button to full depression, the release switch 17 (SW2) is set ON, and a shutter (not shown in the drawing) is opened and closed to perform the taking of a photograph.

The camera drive control CPU 4 and the lens drive control CPU 3 are arranged to exchange signals via the contact points 8. The camera drive control CPU 4 receives, from the lens drive control CPU 3, determination signals of whether or not the camera has an anti-vibration mechanism, and of the focal length of the lens system and the open aperture shutter value, etc. On the other hand, the lens drive control CPU 3 receives from the camera drive control CPU 4, a half depression signal, a release signal, an exposure end signal, and the like.

A description will next be given, based on the flow chart of FIG. 3, of the operational routine of the camera according to the first embodiment. In S101, output is awaited of a full depression signal sent from the camera body 1 accompanying full depression of the release button. In S102, it is determined whether or not the vibration correction lens 7 is in its initial position. In S103, the vibration correction lens 7 is driven to its initial position if it was determined not to be in its initial position in S102.

In S104, if in S102 the vibration correction lens 7 is determined to be in its initial position, driving of the vibration correction lens 7 in a fixed direction is commenced while the lens drive control CPU 3 counts the pulses from the photointerrupter, and the position of the vibration correction lens 7 is read into the EEPROM 15, the vibration correction lens 7 being driven until reaching the position of best optical performance.

In S105, it is determined whether or not vibration correction is to occur. Here, when non-performance of vibration correction has been set, photography is performed without further changes.

In S106, driving of the vibration correction lens 7 is commenced according to the camera vibration information input of the angular velocity sensor 5. In S107, it is determined whether or not the vibration correction lens 7 has reached a limit position of the drive range as stored in the EEPROM 15. In S108, when the vibration correction lens 7 approaches the limit of the drive range in S107, the drive speed of the vibration correction lens 7 is reduced.

In S109, an input of an exposure completion signal from the camera body 1 is awaited. If an exposure completion signal has not been received from the camera body 1, the sequence S107–S109 is repeated. In S110, when an exposure completion signal had been input in S109, driving of the vibration correction lens 7 is stopped. In S111, the vibration correction lens 7 is driven to its initial position.

Figure 4:
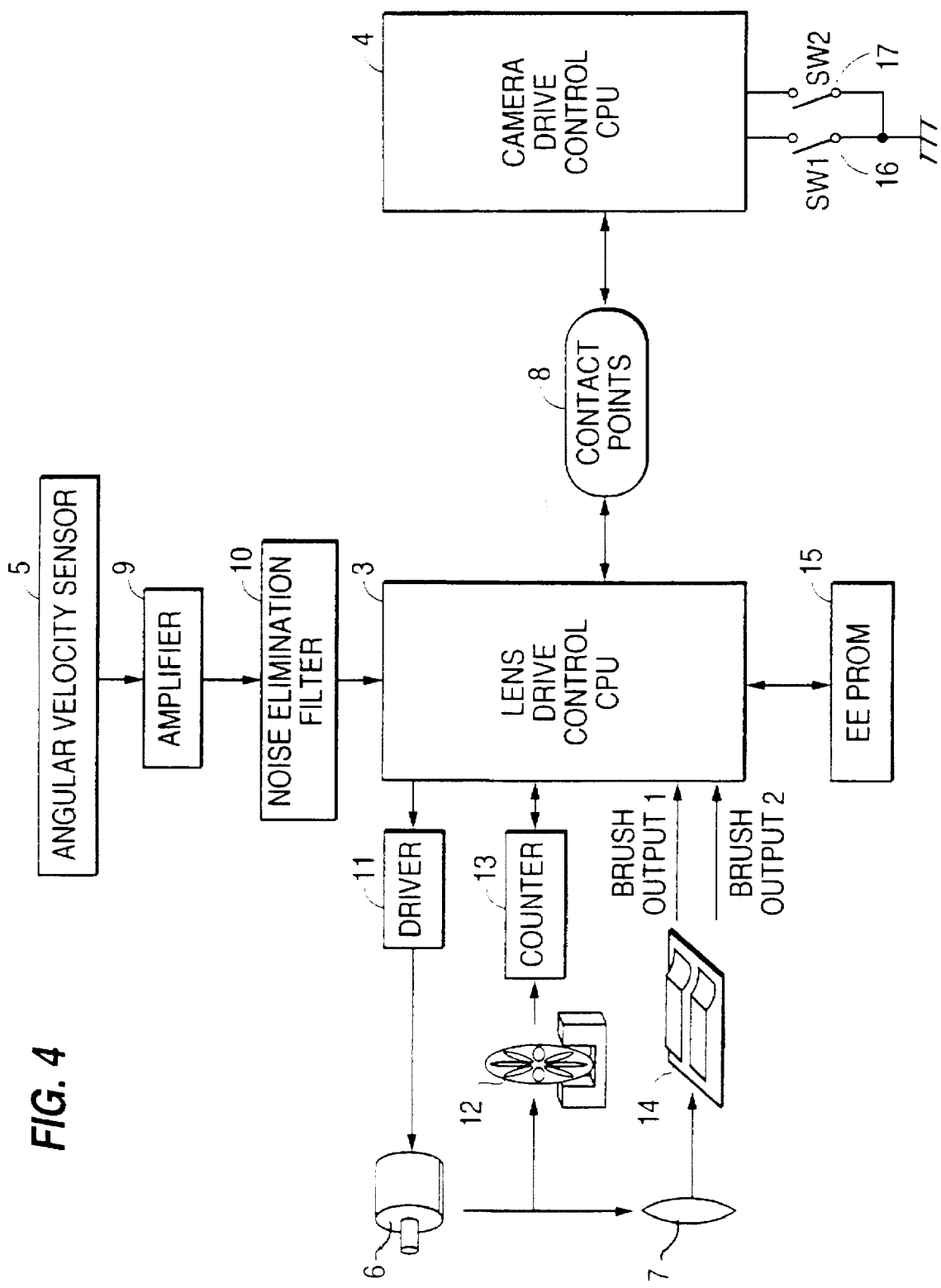
FIG. 4 is a block diagram showing a control system of a camera having a movable lens according to a second embodiment of the present invention.

FIG. 4 is a control block diagram showing a camera having a movable lens according to a second embodiment of the present invention. Sliding brush contacts 14 coupled to the vibration correction lens 7 have been added, in order to detect the absolute position of the vibration correction lens 7. The control system, apart from the addition of the brush contacts 14, is generally the same as that of the first embodiment of the present invention, and the same symbols are used for common parts, duplicate descriptions being omitted.

The brush contacts 14, sliding and coupled with the drive of the vibration correction lens 7, output brush output signal 1, which is a high level signal when the brush contacts 14 and vibration correction lens 7 are close to either end of the drive range of the vibration correction lens 7 (within the limit value of the drive range of the vibration correction lens 7), and is a low level signal further inside the drive range, to the CPU 3. The brush contacts 14 also output brush output signal 2, which is a high level signal while the vibration correction lens is driven from one end of the drive range to a position at about the center of the drive range of the vibration correction lens 7, changing to a low level signal at this center position.

EEPROM 15 is disposed in the lens barrel 2 to store the position of best performance of the optical system of the vibration correction lens 7, the limit positions of the drive range of the vibration correction lens 7, and the like.

The lens drive control CPU 3 stores into the EEPROM 15 the number of pulses of the photointerrupter 12 corresponding to the distance from about the center position of the drive range of the vibration correction lens 7 (position at which the brush output 2 changes) to the position of best optical performance, and the direction from the center position.

In the case of driving the vibration correction lens 7 to the position of best optical performance, the vibration correction lens 7 is driven until the brush output 2 changes, and from this position the vibration correction lens 7 is driven in the direction which had been written into the EEPROM 15 to the extent of the count number which had been written in.

Moreover, the lens drive control CPU 3, driving the vibration correction lens 7 from one end to the other end of the drive range, counts the pulse number of the full scale of the drive range, from the position of changeover of the output of brush output 1 to the limit position of the drive range of the vibration correction lens 7, and stores the count number by writing it into the EEPROM 15.

Figure 5:
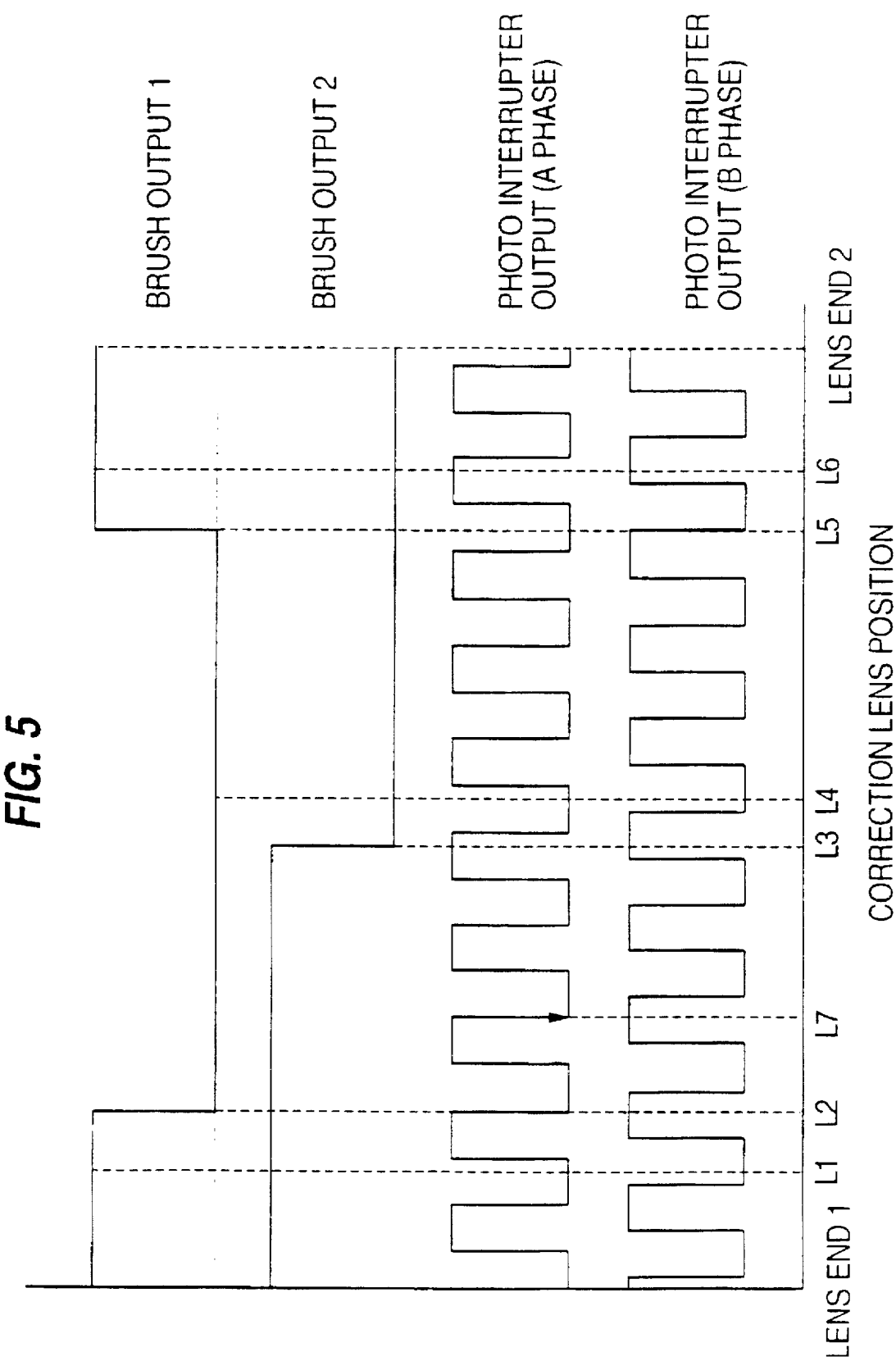
FIG. 5 is a diagram showing the output of a position detection unit of a movable lens according to the second embodiment of the present invention.

FIG. 5 is a diagram showing the outputs of the brushes 14 (brush output 1, brush output 2) and the photointerrupter 12, when the vibration correction lens 7 is driven from a lens end 1 on one side of the drive range to a lens end 2 on the other side.

At the lens end 1, the brush output 1 and the brush output 2 are both at the high level. Positions L1–L6 are as follows.

Position L1 is a limit position of the drive range of the vibration correction lens 7. Position L2 shows a position of the vibration correction lens 7 driven somewhat inward from the lens end 1. At position L3, the brush output 2 changes to the low level, showing that the vibration correction lens 7 is in a position about in the center of the drive range.

Position L4 shows the position of best optical performance of the vibration correction lens 7. Position L5, with brush output 1 alone changing to a high level, shows that the vibration correction lens 7 is before but near the lens end 2. Position L6 shows a limit position of the drive range of the vibration correction lens 7.

Here, the lens drive control CPU 3 stores in the EEPROM 15, as information on the limit positions of the vibration correction lens 7, the number of pulses of the photointerrupter 12 corresponding to the distances between position L1 and position L2 and between position L5 and position L6, and, as information on the position of best optical performance of the vibration correction lens 7, the number of pulses of the photointerrupter 12 corresponding to the distance between position L3 and position L4.

Then, from the positions at which the brush outputs 1, 2 changed, by counting the number of pulses output from the photointerrupter 12, it is possible to detect the accurate absolute position of the vibration correction lens 7.

Moreover, by obtaining the two pulse outputs, displaced in phase by 90°, from the photointerrupter 12, by detecting the position of the fall of the output (A phase) of the photointerrupter 12, a position such as L7, and by detecting the high level and low level of the photointerrupter 12 output (B phase), it is possible to determine the drive direction of the vibration correction lens 7.

Figure 6:
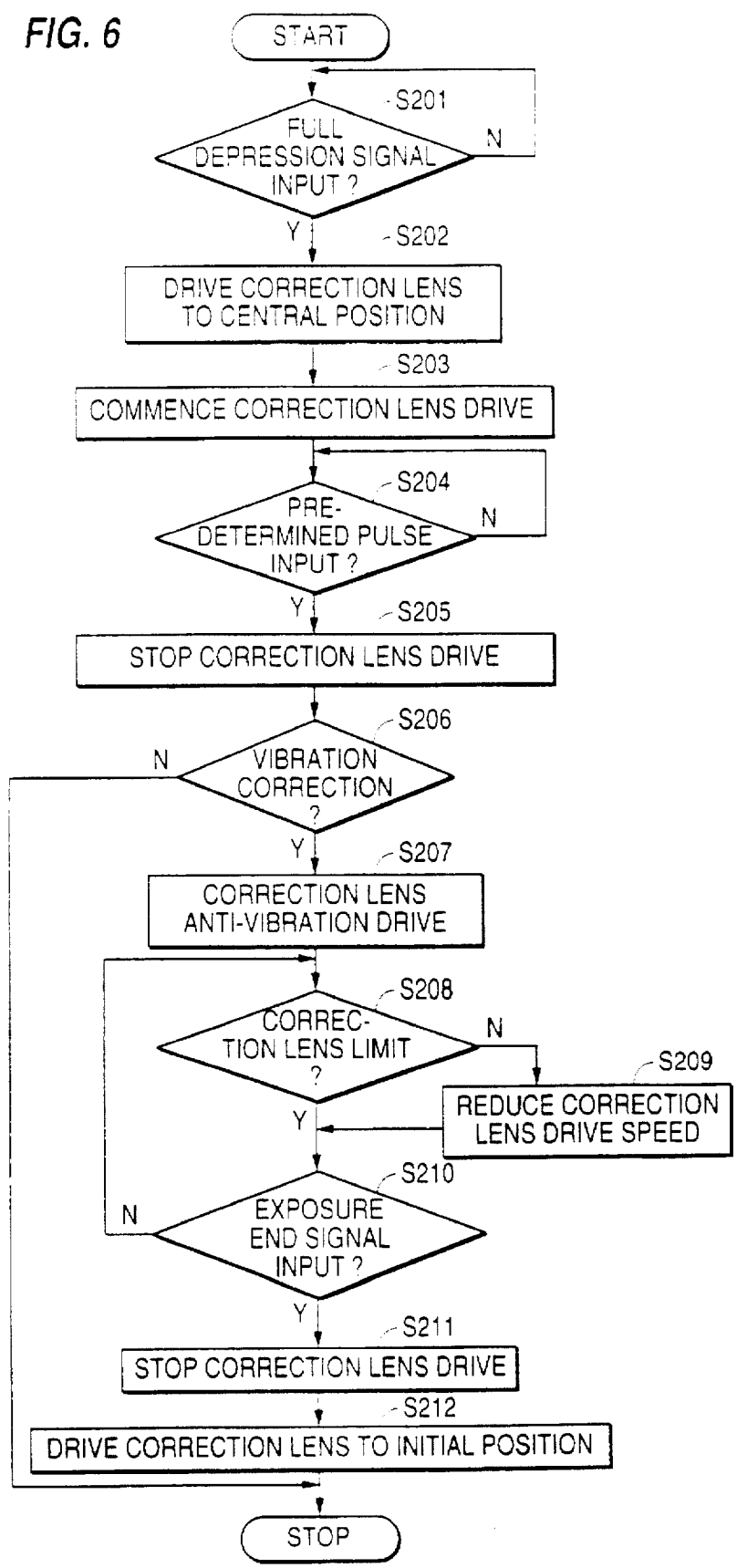
FIG. 6 is a flow chart illustrating the operational routine of a camera according to the second embodiment of the present invention.

The operational routine of the camera of the second embodiment in the case of photography is next described, based on the flow chart of FIG. 6. In S201, input is awaited of a full depression signal sent from the camera body 1 accompanying full depression of the release button. In S202, the vibration correction lens 7 is driven to the position at the center of the drive range, where the brush output 2 changes from a high level to a low level. In S203, after the vibration correction lens 7 has been driven to the center position of the drive range, drive of the vibration correction lens 7 is commenced in the direction of the position, stored in the EEPROM 15, of the best optical performance by the vibration correction lens 7.

In S204, the counter 13 begins to count the number of count pulses output from the photointerrupter 12, and it is determined whether or not the pulse count has been reached which corresponds to the distance up to the position of best optical performance from the center position of the drive range of the vibration correction lens 7, this count having been stored in the EEPROM 15.

In S205, when the count of pulses output from the photointerrupter 12 has reached a given value, the drive of the vibration correction lens 7 is stopped. In S206, it is determined whether or not correction of vibration is to occur. Here, in the case that the performance of vibration correction has not been set, photography is performed without further changes. If it is determined in S206 that correction of vibration is to occur, the drive of the vibration correction lens 7 is commenced according to the information of camera vibration input from the angular velocity sensor 5 in S207. In S208, a determination is made whether or not the vibration correction lens 7 has reached a limit position of the drive range, as stored in the EEPROM 15. In S209, when in S208 the vibration correction lens 7 has reached a limit position of the drive range, the drive speed of the vibration correction lens 7 is reduced.

In S210, an input of an exposure completion signal from the camera body 1 is awaited. If an exposure completion signal has not been output from the camera body 1, the sequence S208–S210 is repeated. In S211, when an exposure completion signal has been received in S210, driving of the vibration correction lens 7 is stopped. In S212, the vibration correction lens 7 is driven to its initial position.

Although two embodiments of the present invention have been described, the present invention is not limited to these two embodiments. Various modifications or changes are possible, and these are also included in the present invention.

For example, the memory unit has been described as being an EEPROM, but a volatile memory may also be used if a backup electrical source is provided in the camera body or the lens barrel.

Moreover, a single lens reflex ("SLR") camera with interchangeable lenses has been described as an example, but a lens shutter ("LS") camera may be used instead. Moreover, in the case of an interchangeable lens camera, even when the camera body does not have an anti-vibration function, if the movable lens is interchanged after returning to the position of best optical performance, it becomes possible to take photographs with high resolution.

In addition to the movable lens described in the first and second embodiments, other types of lens groups, such as an autofocus lens or power zoom lens, may be used so as to move in the direction of the optical axis.

According to the present preferred embodiments of the invention as described above, a memory unit is disposed to store the absolute position of a movable lens. For example, the position of best performance, and the limiting positions of the drive range, of a movable lens, may be stored in the memory unit.

Accordingly, in the case of driving a movable lens (vibration correction lens) to correct for vibration of the camera body, when performing photography not using an anti-vibration function, because photography is performed after the movable lens has been driven to the position of best optical performance, photographs having better resolution can be taken.

Moreover, when photography is performed using the anti-vibration function, because the movable lens has been driven to the position of best optical performance, stored in the memory unit, and, then, the movable lens is driven from this position, the effect is that the photograph taken has better resolution.

Furthermore, when the movable lens has reached the limit position of the drive range, the speed of the movable lens is reduced such that a collision of the movable lens with the end of the drive range can be avoided, preventing the generation of additional vibration and damage to the mechanism of the vibration correction system.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A camera having an image plane, comprising:

an optical lens system having a first optical axis and focusing the image on the image plane;

a vibration detection unit to detect an amount of vibration of the camera;

a movable lens;

a calculation unit to determine an amount of movement of the movable lens required to prevent vibration of an image on the image plane, based upon the amount of vibration detected by said vibration detection unit;

a memory unit to store position information indicative of a correlation between the position of best optical performance of said movable lens wherein an optical axis of the movable lens coincides with the first optical axis and a selected position; and a lens drive unit to drive said movable lens to the position of best optical performance based upon stored position information and then to drive said movable lens based upon the amount of movement determined by said calculation unit.

2. The camera according to claim 1, wherein said memory unit further stores limit position data indicative of limiting positions of a drive range of said movable lens.

3. A camera having an image plane, comprising:

a vibration detection unit to detect an amount of vibration of the camera;

an optical lens system having a first optical axis, to focus an image on the image plane;

a movable lens having a second optical axis;

a movement determination unit to determine an amount of movement of said movable lens required to prevent vibration of the image on the image plane, based upon the amount of vibration detected by said vibration detection unit, and to store a correlation between an optimal position of said movable lens in a plane orthogonal to the first optical axis such that the first and second optical axes coincide and a selected position; and a lens drive unit to drive said movable lens from the selected position to the optimal position based upon the stored position information prior to the camera taking a photograph and subsequently to drive said movable lens from the optimal position based on the amount of movement determined by said movement determination unit if performing prevention of the vibration of the image on the image plane.

4. The camera as claimed in claim 3, wherein said movement determination unit comprises:

a calculation unit to determine said amount of movement of said movable lens required to prevent vibration;

a memory unit to store the correlation between said optimal position of said movable lens and said selected position; and a position detection unit to determine a current position of said movable lens.

5. The camera as claimed in claim 4, wherein said memory unit is an EEPROM.

6. The camera as claimed in claim 4, wherein said position detection unit comprises:

a photointerrupter to generate a number of pulses based on movement of the lens drive unit; and a counter to count the number of pulses.

7. The camera as claimed in claim 6, wherein:

said memory unit stores limit position data indicative of first and second limit positions of said movable lens; and said movement determination unit commands said lens drive unit to reduce a speed of said movable lens based upon when said movable lens approaches said first and second limit positions.

8. The camera as claimed in claim 7, wherein said memory unit stores a value indicative of the number of pulses said photointerrupter generates when said movable lens moves from said first limit position of said movable lens to the optimal position; and said lens drive unit drives said movable lent, prior to the camera taking a photograph, from said first limit position to the optimal position based on the value stored by said memory unit.

9. The camera as claimed in claim 6, further comprising:

a photointerrupter to generate a number of pulses based on movement of the lens drive unit;

a counter to count the number of pulses;

said position detection unit including brush contacts, coupled to said movable lens, to detect a current position of said movable lens, said brush contacts outputting position signals indicative of first and second limit positions of a drive range of said movable lens and a center position of the drive range;

said memory unit to store a value indicative of the number of pulses said photointerrupter generates when said movable lens moves from the center position of said movable lens to the optimal position; and said lens drive unit to drive said movable lens, prior to the camera taking a photograph, from the center position to the optimal position based on the value stored by said memory unit.

10. The camera as claimed in claim 9, wherein said lens drive unit reduces a speed of said movable lens when said movable lens approaches one of said first and second limit positions, in response to said position signals from said contact brushes.

11. The camera as claimed in claim 9, wherein said photointerrupter outputs first and second series of pulses differing in phase by 90°.

12. The camera as claimed in claim 1, wherein said memory unit is an EEPROM.

13. A camera having an image plane, comprising:

an optical lens system having a first optical axis and focusing the image on the image plane;

a movable lens, having an optical axis movable in a first direction parallel to the optical axis and a second direction orthogonal to the optical axis;

a calculation unit to determine an amount of movement of the movable lens;

a memory unit to store position information of the movable lens indicative of a correlation between a position of best optical performance of said movable lens wherein the optical axis of the movable lens coincides with the first optical axis and a selected position; and a lens drive unit to drive the movable lens to the position of best optical performance from the selected position based upon the stored position information and then to drive the movable lens based upon the amount of movement determined by said calculation unit.

14. The camera as claimed in claim 13, wherein said memory unit is an EEPROM.

15. A method of preventing image blur of an image on an image plane of a camera through the movement of a movable lens in a direction orthogonal to a first optical axis of an optical lens system, the method comprising:

determining vibration of the camera, to produce vibration information;

storing position information indicative of a correlation between an optimal position of the movable lens such that a second optical axis of the movable lens coincides with the first optical axis and a selected position, and driving the movable lens from the selected position to the optimal position prior to taking a photograph using the stored position information; and moving the movable lens in the direction orthogonal to the first optical axis based upon the vibration information if vibration correction is to be performed and maintaining the movable lens at the optimal position during the taking of the photograph if vibration correction is not to be performed.

16. The method as claimed in claim 15, further comprising:

determining, prior to driving the movable lens to the optimal position, whether the movable lens is at an initial position which is a first limit position of the movable lens and driving the movable lens to the initial position if the determination is negative; and driving the movable lens from the initial position to the optimal position.

17. The method as claimed in claim 16, wherein said step of moving the movable lens in the direction orthogonal to the first optical axis further comprises:

determining a current position of the movable lens;

determining whether the movable lens is approaching a limit position of the movable lens; and reducing a speed of the movable lens when the movable lens approaches the limit position.

18. The method as claimed in claim 15, further comprising the steps of:

determining, prior to driving the movable lens to the optimal position, whether the movable lens is at a central position of a drive range of the movable lens and driving the movable lens to the central position if the determination is negative; and driving the movable lens to the optimal position.

19. The method as claimed in claim 16, wherein said step of moving the movable lens in the direction orthogonal to the first optical axis further comprises:

determining a current position of the movable lens;

determining whether the movable lens is approaching a limit position of the movable lens; and reducing a speed of the movable lens when the movable lens approaches the limit position.

20. A camera having an image plane, comprising:

a vibration detection unit to detect an amount of vibration of the camera;

a movable lens;

a calculation unit to determine an amount of movement of the movable lens required to prevent vibration of an image on the image plane, based upon the amount of vibration detected by said vibration detection unit;

an absolute position detection unit to detect absolute position information indicative of an absolute position of said movable lens;

a relative position detection unit to detect relative position information indicative of a position relative to the absolute position of said movable lens from the absolute position information of said movable lens detected by said absolute position detection unit;

a memory unit to store the relative position information of the movable lens detected by said relative position detection unit; and a lens drive unit to drive said movable lens based upon the amount of movement determined by said calculation unit and the relative position information.

21. The camera according to claim 20, further comprising:

an optical lens system having a first optical axis and focusing the image on an image plane;

wherein said memory unit stores limit position data indicative of limiting positions of a drive range of said movable lens, and a position of best optical performance of said movable lens wherein an optical axis of said movable lens coincides with the first optical axis.

22. The camera according to claim 20, wherein said memory unit is an EEPROM.

23. The camera according to claim 20, wherein said absolute position detection unit comprises:

a conductor pattern; and a brush which moves in conjunction with said movable lens and contacts said conductor pattern to determine the absolute position of said movable lens.

24. The camera according to claim 20, wherein said relative position detection unit comprises a photointerruptor for counting pulses based upon movement of said movable lens to determine the relative position of said movable lens.

* * * * *

UNITED STATES PATENT AND TRADEMARK OFFICE
CERTIFICATE OF CORRECTION

PATENT NO. : 5,634,142

DATED : May 27, 1997

INVENTOR(S) : Imafuji et al.

It is certified that error appears in the above-identified patent and that said Letters Patent is hereby corrected as shown below:

Col. 9, line 59, (claim 3) after "system" insert --,--.

Col. 10, line 43, (claim 8) "lent" should be --lens--.

Signed and Sealed this

Sixteenth Day of September, 1997

Attest:

BRUCE LEHMAN

*Attesting Officer*     *Commissioner of Patents and Trademarks*